July 1, 1930.　　　　A. IGNATIEFF　　　　1,769,222
SELF SHARPENING CUTTING INSTRUMENT
Filed Dec. 30, 1925
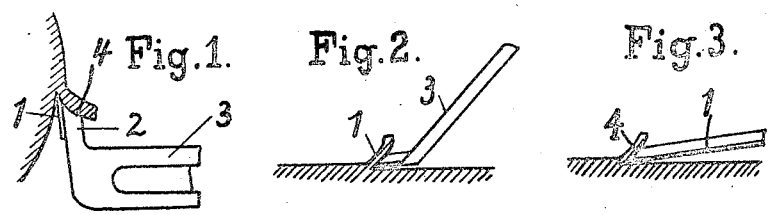
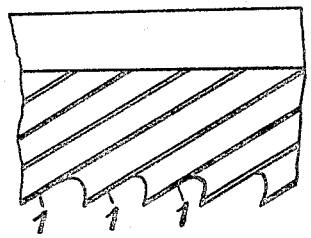
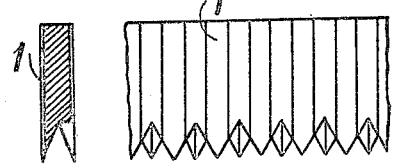
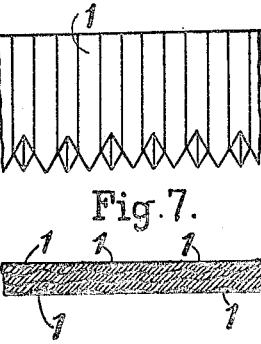
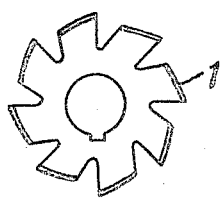
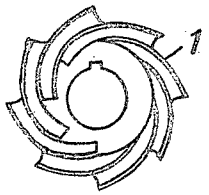
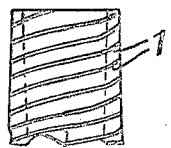
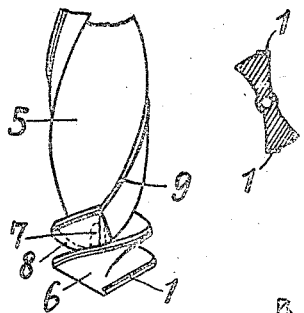
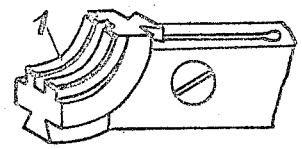
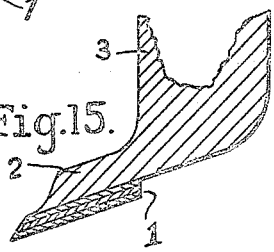
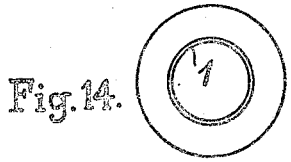
Inventor
Alexander Ignatieff
By B. Singer, Atty.

Patented July 1, 1930

1,769,222

UNITED STATES PATENT OFFICE

ALEXANDER IGNATIEFF, OF MOSCOW, RUSSIA

SELF-SHARPENING CUTTING INSTRUMENT

Application filed December 30, 1925, Serial No. 78,471, and in Germany November 24, 1925.

This invention relates to improvements in cutting or piercing instruments described in my prior Patent No. 1,607,083, in which it is shown, how the said instruments can be composed of several layers of different hardness so as to remain sharp even when worn out in use.

The invention consists therein, that for tools of the type especially used for metal cutting, which tools are formed with a front face and a rear face confining the cutting edge, the rear face is covered by one or several layers of greater hardness than the adjoining part of the tool body. Such tools thus constructed have the advantage of always remaining sharp, whereas in the known tools with a hard layer applied to the front face the wear is only retarded and the cutting edge eventually becomes blunt.

The invention also relates to tools manufactured according to my improved process, as hereinafter described.

The invention is shown in the drawing on several modifications of the tools in question.

Fig. 1 shows a turning tool.
Fig. 2 is a planing or shaping tool.
Fig. 3 is a straight turning or planing tool.
Fig. 4 is a saw.
Figs. 5-7 show details of another type of a saw.
Fig. 8 is a backed off circular cutter.
Fig. 9 is a similar tool.
Fig. 10 is a crown bore.
Figs. 11 and 12 are a drill.
Figs. 13 and 14 are a screw bolt cutter.
Fig. 15 is a detail elevation on an enlarged scale of the form of the invention shown in Fig. 1.

In all the figures two tightly neighboured parallel lines show the hardest layer, to which a great number of gradually softer layers may be adjoined. Every layer may be of a thickness of one hundredth of a millimeter up to far greater thickness, especially as much greater as the material is softer.

According to Fig. 1 a turning tool body is covered on its rear face by a hard cutting layer 1, which may be welded to a supporting part 2, or otherwise fastened, as for instance by means of a clamp and screw. The supporting part 2 is obliquely arranged with respect to the main part 3 of the tool and is of softer material than the cutting layer 1. It may suffice to use only one cutting layer, which together with the supporting part 2 provides a sufficient graduation of hardness for conserving the sharpness, but several layers of graduated hardness may be provided. The front face 4 of the supporting part 2, guiding the detached chip of the work piece, may be manufactured so as to have the shown hollow shape according to the natural shape of the chip, or it may be caused to assume such a shape in the course of being worn out.

According to Fig. 2 a planing or shaping tool without an oblique supporting part is provided immediately on its rear face with a strong cutting plate of multiple layers. This plate projects freely from the tool body against the cutting edge, and it may also project laterally so as to be able to cut and throw aside very great and long chips.

According to Fig. 3 a straight line tool on its one longitudinal face, which serves as rear face, is covered by the cutting layer 1, or manufactured wholly of a plate of piled layers, the hardest of which is the rear layer 1. The front face is rounded in accordance with the shape of the chip. This tool may also be used as a rigidly fastened turning or planing tool or also as a tool held by the hand.

According to Fig. 4 a saw or a tool, with finer and broader teeth, such as a file, is formed by joining together oblique layers in such manner that the hardest layers 1 form the rear of the teeth, and the front faces of the teeth are constructed in the natural shape arising from wear.

According to Figs. 5 to 7 a saw is provided with two parallel rows of teeth of symmetrical shape, seen in the longitudinal direction of the saw sheet. In this saw a soft central layer is covered against both lateral faces with layers of gradually augmented hardness, and the whole is formed to a zigzag or corrugated form and planed on the lateral faces. In this way on the outer faces of the teeth, beginning with the teeth points, the hardest layers extend in the form of staves or stripes, whereas the adjoining parts of the teeth are gradually softer according to the stresses arising in use. Similar saws may also be manufactured of straight layers with laterally adjoined and enforced cutting layers in the form of staves or stripes.

According to Fig. 8 a backed off circular cutter is covered on its spiral faces by the cutting layers, which in accordance with the spiral form have the shape of spiral cylinders or, in circular cutters of special profiles or shapes, the corresponding profile shape with spiral leading lines.

According to Fig. 9 a similar tool has the layers forming the teeth of such length, that they cover each other in two or multiple layers. Every such pile of layers may be of a length sufficing for running several times around the whole tool, so that this latter may have a large original diameter and may be worn out up to a very small diameter without losing its sharpened and original profile.

According to Fig. 10 a crown bore is formed of cutting layers of screw surface shape, four such piles of layers being wound together so as to form on one end four cutting teeth. A central channel is provided, and this channel as well as the outer shape of the tool is conical so as to leave a free space sufficient for avoiding undue friction between the tool and the work piece.

According to Figs. 11 and 12 a drill is composed of a handle or shaft 5 and a drill head 6. The drill head 6 corresponds to the tool shown in Fig. 10 with the exception that only two screw windings are provided, between which free spaces are left for throwing out the chips, instead of a central channel. Moreover a conical point of the drill is produced by forming the screw faces with a generating line disposed obliquely with respect to the drill axis so as to generate a cutting edge which lies on a cone, i. e. obliquely in a radial plane. This drill head 6 may be welded to the shaft 5 or, as shown, connected to it by a centering pin 7. The drill head is rotated with the shaft by the rear ends 8 of its screw shaped layers being caught by corresponding axially projecting ends 9 of the screw like parts of the shaft.

The shaft 5 may be a usual spiral drill, but for effecting a finishing work on the cylindrical faces of the bored hole it may be also provided with cutting layers 1 as shown in Fig. 12. These cutting layers may be formed by spiral cylinder parts bent to screw lines so as to cover the circumferential faces of the shaft, or it may be produced by spirally working an annular cylinder. In this way it is also possible to produce multiple toothed broaches or reamers, helicoidal milling cutters, circular files and the like. The shaft being provided with the necessary projections in the manner of tapping teeth or teeth of a file, and at the outer circumference of these projections, the cutting layers 1 are provided.

According to Figs. 13 and 14 a screw bolt cutter with square screw threads has the main cutting faces of the latter covered by a cutting layer or a pile of cutting layers by being manufactured out of a raw piece as shown in Fig. 14, consisting of an annular cylinder with the hardest layer inward. Screw nut cutting taps may inversely be manufactured out of a raw piece composed of a soft core and enveloping layers of gradually increasing hardness. It is also possible to produce screw thread cutting instruments with completely covered cutting faces by depositing the different layers electrically or by a metal spouting device.

With the knowledge of the described tools it is easy to manufacture still further kinds of tools in the new manner. For instance circular saws and grooved circular cutters are combinations of the devices shown in Figs. 4 and 8.

The cutting layers may consist of any useful materials, for the hardest layers. If materials are used which can not be welded or otherwise physically fastened, the cutting plates are fastened by aid of clamps, pressing plates and the like, especially in heavy tools.

I claim:

1. A tool comprising in combination a tool body, there being a front face and a rear face adjoining in a cutting edge on said body, and a pile of layers of material of gradually increasing hardnesses, applied to the said rear face, the hardest layer being on the outer side and the tool body being of softer material, than the softest layer.

2. A tool with cylindrical shape and cutting end face, comprising in combination, a shaft of the type of spiral drills and a drill head fastened to said shaft on one end and consisting of at least two screw thread like parts which join together by a common central part, each screw thread like part consisting of at least two layers of materials of gradually increasing hardnesses, the hardest layer being outermost for engaging the work and the body of the drill proper being of a material softer than any portion of the layer-formed cutting edge.

In witness whereof I affix my signature.

ALEXANDER IGNATIEFF.